United States Patent [19]

Turunen

[11] 4,307,827
[45] Dec. 29, 1981

[54] METHOD AND DEVICE FOR FEEDING PLANT CELLS IN A PLANTING MACHINE

[75] Inventor: Lasse Turunen, Mänttä, Finland

[73] Assignee: G. A. Serlachius Oy, Mänttä, Finland

[21] Appl. No.: 116,664

[22] Filed: Jan. 29, 1980

[30] Foreign Application Priority Data

Feb. 2, 1979 [FI] Finland .................................. 790355

[51] Int. Cl.³ ........................ A01C 11/02; A01G 9/02; B26F 3/02
[52] U.S. Cl. ......................................... 225/1; 225/94; 225/101; 225/103; 47/77; 111/2
[58] Field of Search ..................... 225/1, 2, 5, 94, 101, 225/103; 83/928; 111/2; 47/77

[56] References Cited

U.S. PATENT DOCUMENTS 3,820,480 6/1974 Blackmore et al. ..................... 111/2
4,132,337 1/1979 Masuda et al. ........................... 225/5

Primary Examiner—James M. Meister
Attorney, Agent, or Firm—Cushman, Darby & Cushman

[57] ABSTRACT

A method for feeding plant cells in a planting machine, whereby a unified line of cells consisting of plant cells connected to each other is detached from a unified cell sheet comprising plant cells, the unified line of cells is shifted downwards on upwards through cutting apparatus which direct a cutting effect at the joints between the individual plant cells in the unified line of cells either from the same direction or from the opposite direction as compared with the direction from which the plant cells are supported during the shifting, in order to cut the cells in the line of cells loose from each other, and the detached plant cells are passed to a distributor in order to feed the plant cells as separated from each other to the planting device. The cutting loose of the plant cells takes place totally automatically when the plant cells are shifted from the cell sheet to the distributor, and does not require any extra movements for cutting loose.

The device for putting the method into effect is provided with cutting devices which are arranged in line one after the other at relative distances so that the cutting devices are positioned on the paths of movement of the joints between the individual plant cells in the line of cells. The cutting devices are arranged underneath or above the plane of the cell sheet. For cutting the plant cells loose, no mechanisms need to be provided in order to produce particular movements for cutting loose.

15 Claims, 15 Drawing Figures

FIG. 11

METHOD AND DEVICE FOR FEEDING PLANT CELLS IN A PLANTING MACHINE

The subject of the present invention is a method for feeding plant cells in a planting machine, according to which method, from a cell sheet consisting of plant cells connected to each other, a unified line of cells consisting of plant cells connected to each other is detached one line at a time, the plant cells in the line of cells are detached from each other, and the separate plant cells are shifted into a distributor means for dosage of the plant cells as separate from each other into the planting device.

Planting machines have been suggested earlier for mechanical planting of plant cells into the ground, in which connection the plants are brought to the planting machine in growing boxes which consist of cell sheets, each of which sheets has a number of plant cells connected to each other at the edges and placed in several parallel lines side by side. The planting machine is usually provided with two planting heads to which the plant cells must be fed from the cell sheet. As the plant cells are planted one by one by means of the planting heads, the plant cells connected to each other must be detached from each other before they can be planted.

It has been previously known to move the plant cells by hand to the planting heads or onto the conveyor belts passing to same. The plant cells are, as a rule, moist, soft and brittle, and since the plant cells are fixed to each other in the cell sheet, they tend to crumble and be crushed in the hand when attempts are made to lift them one by one. Moreover, it is difficult to get a good hold of cells placed close to each other, and only a few cells can be handled at a time.

From the Finnish Letters Patent No. 54,549, a method for feeding plant cells is previously known according to which method a unified line of cells is first detached from the cell sheet, from which line of cells the individual cells are thereupon detached. For the purpose of this detaching, the feeding device disclosed in said patent is provided with grasping means that always grasp only one cell at a time out of the unified line of cells. The detaching of a cell from the unified line of cells is based on tearing the cell loose from the adjoining cell by means of an appropriate twisting move of the grasping means. Such a method of separation is, however, very slow and the twisting mechanism of the grasping means is highly spacious. Moreover, there is the risk that the cell is not torn loose from the adjoining cell along the connecting narrow portion, but even a part of the side wall of the adjoining cell may be torn loose and come with the detached cell, because the cells are rather brittle, as has been explained above. This tends to cause disturbance in feeding at some step of the mechanical planting.

It is an objective of the present invention to provide a method that avoids the above drawbacks and that permits mechanical separation of plant cells without major risk of individual plant cells being broken. This objective is achieved by means of the method in accordance with the present invention, which is characterized in that the unified line of cells separated from the cell sheet is shifted in a direction transversal to the plane of the narrow portions connecting the plant cells through cutting means positioned on the path of movement of the said narrow portions before the distributor means.

The invention is based on the idea that the movement of shifting of the line of cells, by means of which the cells are shifted from the cell sheet to the planting device, is utilized in order to direct the cutting effect at the line of cells to be shifted so as to detach the individual cells from each other by force. This is achieved by passing the line of cells through a line formed by cutting means, which line cuts the cells apart precisely along the narrow portions connecting the cells together. Thus, the line of cells need not be shifted to any particular detaching position, nor need any particular detaching movements be performed in order to detach the cells. Thus, the cutting loose of the cells takes place entirely automatically during the shifting movement, which shifting movement must be performed anyway.

The method in accordance with the invention can be put into effect in two different ways in principle, depending on the location of the distributor means in relation to the position at which the line of cells is detached from the cell sheet. When the line of cells is shifted from the point of separation down to the distributor means, the line of cells is pulled down by grasping means or the line of cells is simply dropped between the cutting and detaching means placed underneath the line of cells. In this way the plant cells in the line of cells can be detached from each other only above the shoots of the distributor means automatically while the partition walls between the shoots function as the detaching means at the end of the shifting movement of the line of cells. Thus, possible crushing of plant cells does no longer cause major harm, because the individual plant cells will anyway fall down into their own shoots substantially in correct positions. Thus, in this embodiment the grasping means and the cutting means are placed on the same side in relation to the connecting narrow portions between the cells.

The method in accordance with the invention can also be carried out so that the detached line of cells is shifted upwards into the distributor means, whereby the line of cells is pushed upwards by means of the grasping means between the means that cut the cells loose. In such a case the grasping means and the cutting means are placed at different sides in relation to the connecting narrow portions between the cells so that the cutting loose is achieved in the way of scissors. Nor are the grasping means able to slide away from their hold with individual cells, because the line of cells is being pushed against the cutting means from their opposite side.

The present invention is also concerned with a device for the implementation of the method in accordance with the invention, and this device is characterized in what is stated in claim 8. The speeds of movement of the device are low but the handling capacity is high.

For the separation of the individual cells included in the line of cells, it is unnecessary to provide the grasping means with any particular mechanisms in order to produce movements of separation, because the separation of the cells takes place in connection with a normal movement of shifting of the grasping means.

The invention will be described more closely below with reference to the attached drawings, wherein.

Figure 1:
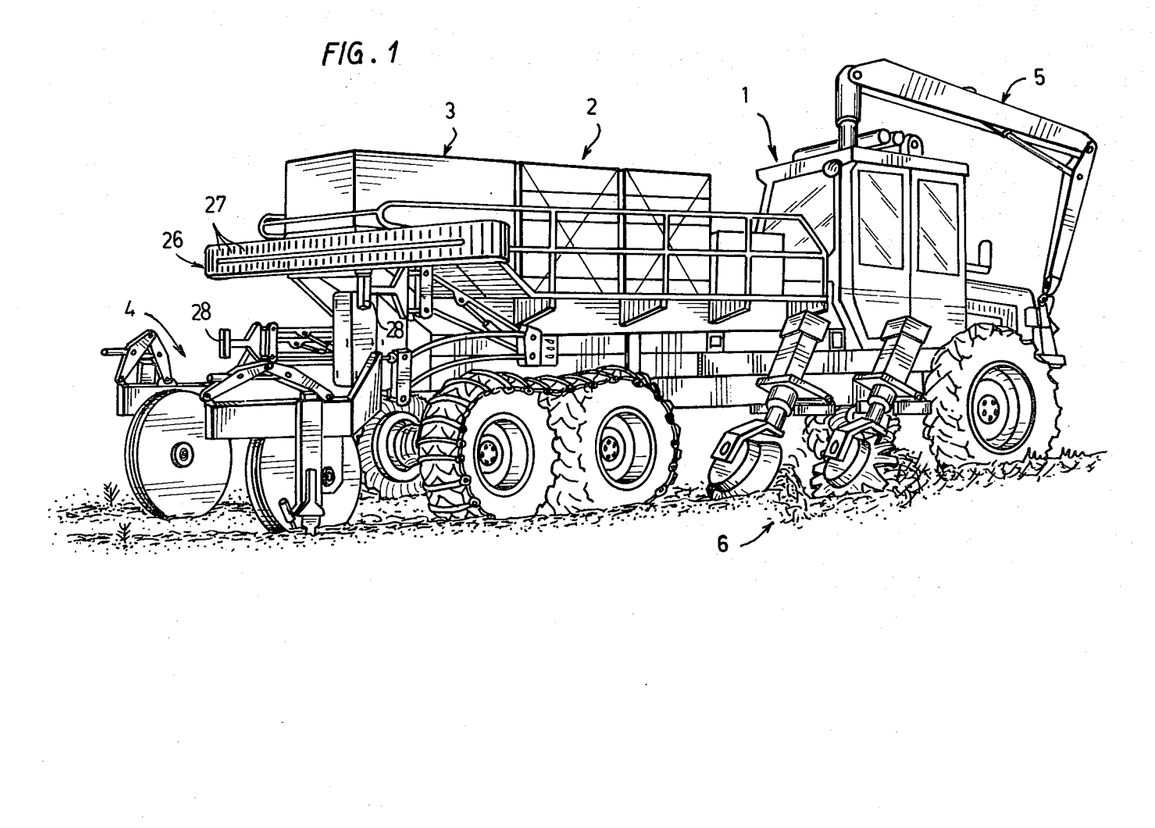
FIG. 1 is a perspective view from behind-side of a planting machine provided with a plant feeding device in accordance with the invention.

Regarding its main parts, the planting machine shown in FIG. 1 of the drawing comprises a forest tractor 1, transport containers 2 for plants, a feeding device 3, a planting device 4, a crane 5, and a soil preparing device 6.

The supporting means 7 forms a plane base for the cell sheets 8 to be shifted one by one from the transport container 2. The cell sheet comprises a number of plant cells 12 placed in parallel lines, which cells are connected to each other along their upper edges. The cell sheet is manufactured in a way in itself known, e.g., out of fibre mass.

Figure 5:
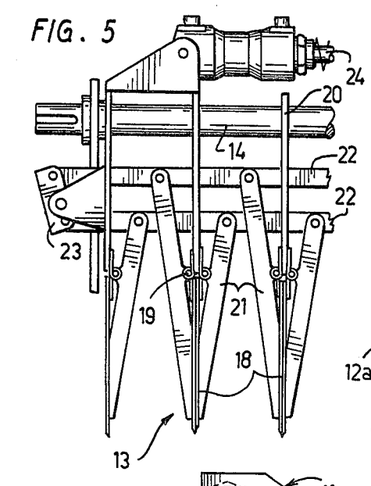
FIGS. 5 and 6 show the shifting means as viewed from the front with the grasping means being positioned in the detaching position and in the grasping position, respectively.
Figure 6:
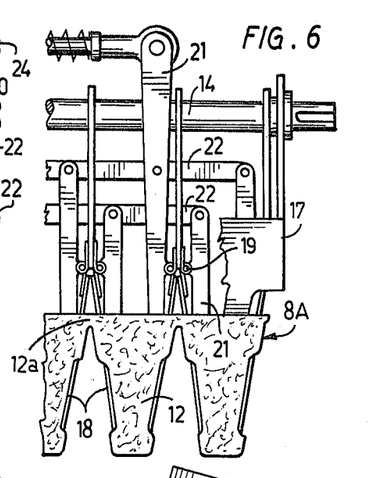

The shifting device comprises a number of pairs of compression jaws 13, which are fastened to a pivoting shaft 14 which rests on supports 15 at its opposite ends. The supports glide along two parallel guides 16 which are perpendicular to the pivoting shaft. The supports may be moved by mechanical transfer chains or by pressure-medium operated transfer means, not shown in the drawing. An aligning plate 17 is also supported on the pivoting shafts. As comes out more closely from FIGS. 5 and 6, each pair of compression jaws comprises two pressure disks 18 which are pivotably mounted by means of articulated joints 19 to support plates 20 supported by the pivoting shaft. The pressure disks are by means of connecting arms 21 connected to the shifting rods 22, which are at one end mounted to a lever arm 23. The connecting arm 21' has been lengthened upwards and is by means of an articulated joint fastened to another shifting rod 22 and at its upper end to the drive gear 24. The arrangement is such that, when the pressure-medium operated drive gear moves the said lengthened connecting arm 21', the pressure disks 18 are pivoted between the detaching position shown in FIG. 5 and the grasping position shown in FIG. 6.

Figure 7:
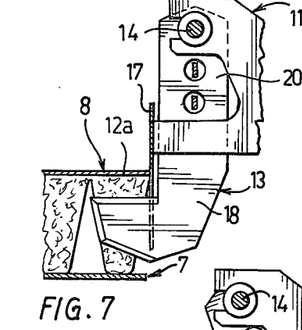
FIGS. 7 to 9 show the grasping means of the shifting means in the grasping position, shifting position, and in the delivery position, respectively.
Figure 9:
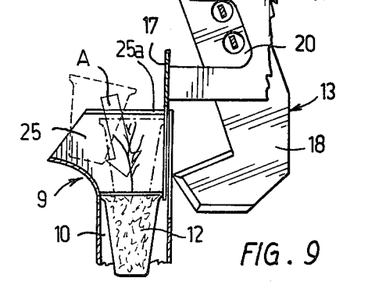

By means of a pivoting device, not shown in the drawings, the pivoting shaft 14 can be pivoted between the grasping position shown in FIG. 7 and the detaching position shown in FIG. 9. When the compression jaws have assumed the grasping position, the jaws are closed, and slightly before the compression jaws have assumed the detaching position, the jaws are opened.

The distributor means 9 comprises a number of distribution shoots 10 side by side, which shoots form a line parallel to the pivoting shaft of the shifting device. The distribution shoots are separated from each other by vertical partition walls 25. A continuous feeding conveyor 26 (FIG. 1) provided with subsequent compartments 27 circulates underneath the shoots of the distributor device.

Figure 2:
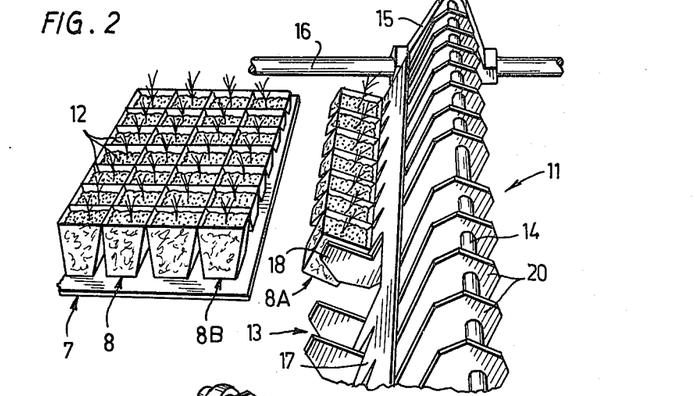
FIG. 2 is a perspective view from above-side of the feeding device with the shifting means positioned in the shifting position, FIG. 3 likewise shows the feeding device, with the shifting means positioned in the dropping position, FIG. 4 likewise shows the feeding device, with the shifting means positioned in the delivery position.
Figure 8:
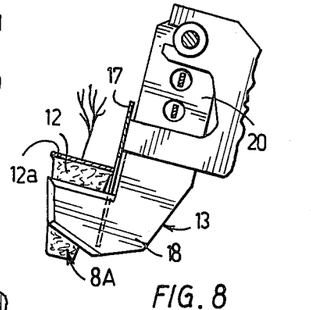

The device shown in the drawings operates as follows: The shifting device 11 moves towards the support means 7 while the pairs 13 of compression jaws are pivoted in the grasping position shown in FIG. 7 and shifted apart from each other to the detaching positions shown in FIG. 5. When the shifting device continues its movement towards the supporting means 7, the pressure disks 18 of the compression jaws penetrate in between the cells. After the shifting device has reached its extreme position and the aligning plate 17 has aligned the cells into a straight line, the drive gear 24 receives an impulse to move the pressure disks so that they are in pairs pressed against the plant cells placed between them in the way shown in FIG. 6. In this way the pressure disks grasp all the cells placed in the first line 8A of the cell sheet. At the same time a holding device, not shown in the drawing, holds the plant cells placed in the next line 8B of the cell sheet back in position. Hereupon the compression jaw pairs are pivoted into the shifting position shown in FIG. 8, whereby the entire cell line 8A is torn loose along the connecting edge from the remaining cell line 8B of the cell sheet, as is shown in FIG. 2.

Figure 3:
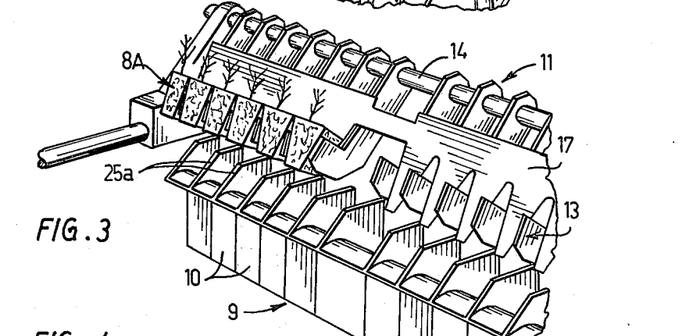
Figure 4:
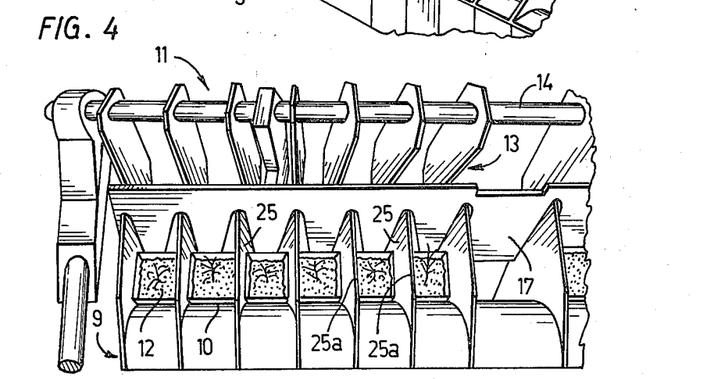

The shifting device now shifts the line of cells 8A to above the distributor means 9, as is shown in FIG. 3. A pivoting mechanism, not shown, pivots the pairs of compression jaws together with the plant cells down in the direction of the arrow A, whereby the connecting narrow portions 12a between the cells 12 are hit against the upper edges 25a of the partition walls 25 between the distribution shoots 10, which edges cut the cells apart from each other. The downward pivoting movement of the compression jaws 13 pulls the separate cells down into the corresponding distribution shoots. The aligning plate 17 stops substantially in the vertical position, and at the same time the drive gear 24 receives an impulse to pivot the pressure disks 18 into the detaching position shown in FIG. 5 so that the plant cells fall down into the shoots while the compression jaws 18 continue their pivoting movement to the detaching position shown in FIG. 9. The plant cells can drop from the shoots down into the compartments 27 of the feeding conveyor 26, which step by step shifts one cell at a time within the reach of the feeding pipe 28 of each planting device 4. Hereupon the shifting device 11 starts moving again towards the support means 7, whereby the pairs of compression jaws 13 are again pivoted into the grasping position shown in FIG. 7.

The embodiment of feeding device shown in FIGS. 10 to 15 differs from the preceding embodiment mainly only in the respect that the plant cells are shifted from the cell sheet along the upper way into the distributor device for the cells. Components with identical functions have, for the sake of clarity, been denoted with the same reference numerals.

The feeding device shown in FIGS. 10 to 15 of the drawing substantially comprises a support means 7 for the cell sheet 8, a distributor means 9 with the shoots 10, and a shifting device 11 moving between the support means and the distributor means.

The shifting device comprises a vertical pivoting shaft 30 pivotably mounted to the frame 29, onto which shaft a pivoting arm 31 has been mounted as gliding.

Between the pivoting arm and a support 32 pivotably mounted on the pivoting shaft, a lifting cylinder 33 has been mounted, by means of which the pivoting arm can be raised and lowered along the pivoting shaft. A pivoting cylinder 34 is fastened to the frame, by means of which cylinder the pivoting arm can be pivoted from the grasping position shown in the left half of FIG. 12 to the detaching position shown in the right half of FIG. 12 and back again. In the grasping position the pivoting arm is positioned perpendicularly to direction of arrival of the cell sheets, and in the detaching position the pivoting arm is parallel to the direction of arrival of the cell sheets.

The pivoting shaft 14 described above together with its pairs of compression jaws 13 and positioning mechanisms 20–24 has been mounted as resting on the said pivoting arm 31.

Above the cell sheet 8, resting on the frame, curved shifting grooves 35 have been mounted that are provided with a bottom 42 and with partition walls 43. The shifting grooves form an arc of 90° towards the sides of the feeding device. Underneath the outer ends of the shifting grooves, the distribution shoots 10 of the distributor means 9 have been mounted. A feeding conveyor 26 moves underneath the distribution shoots, which conveyor is provided with compartments 27 and which extends between the distributor device 9 and the feeding pipe 28 of the planting device 4.

Alongside the distributor device 9, a pushing device 36 has been mounted which comprises, for each shifting groove, a pushing rod 37 that is mounted as gliding on a stationary vertical bar 38 and connected to an operating cylinder 39, by means of which the pushing rod can be raised and lowered along the vertical bar.

At the inlet ends of the shifting grooves 35, at the planes of the partition walls, downwardly directed cutting disks 40 have been mounted, whose diagonal lower edge 40a is sharp. Above the cell sheets, holding strips 41 have been fastened to the frame, which strips are placed in the same vertical plane with the cutting disks 40 above the narrow connecting portions in the cell sheet, parallel to the direction of arrival of the plant cells.

Figure 10:
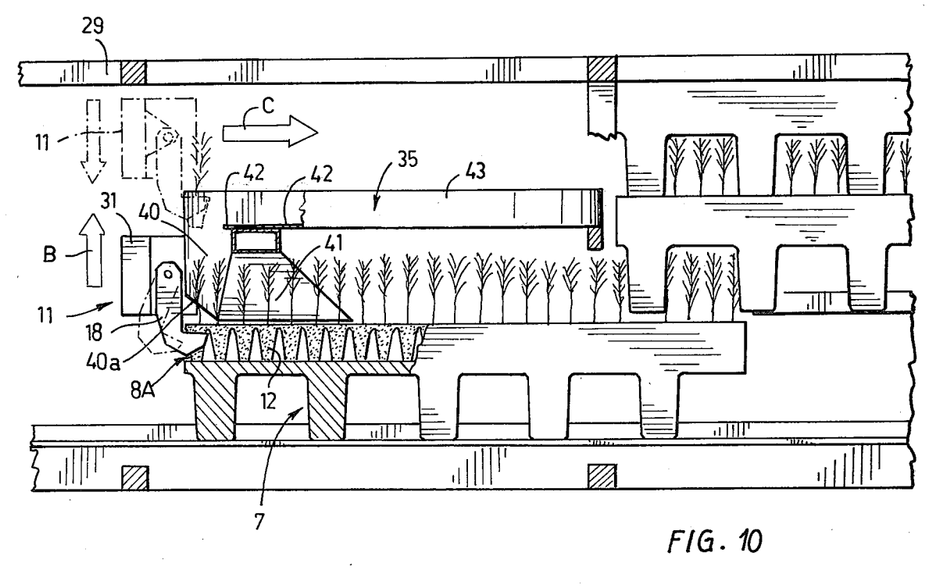
FIG. 10 is a side view of another embodiment of a feeding device in accordance with the invention with the grasping means being positioned in the grasping position, as a section along line X—X in FIG. 12.
Figure 11:
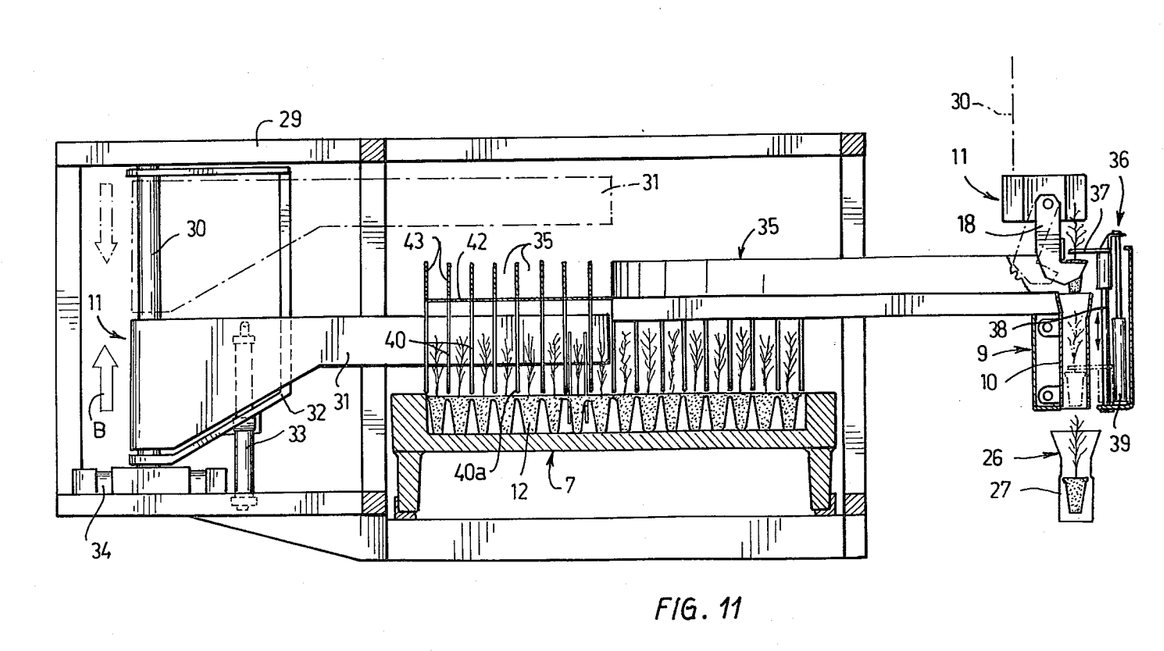
FIG. 11 shows the feeding device as viewed from the front as a section along line XI—XI in FIG. 12.
Figure 13:
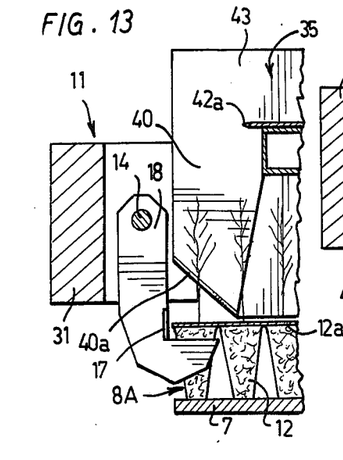
FIGS. 13 to 15 show enlarged views of the grasping means of the shifting means in the grasping position, cutting position, and in the shifting position, respectively.
Figure 14:
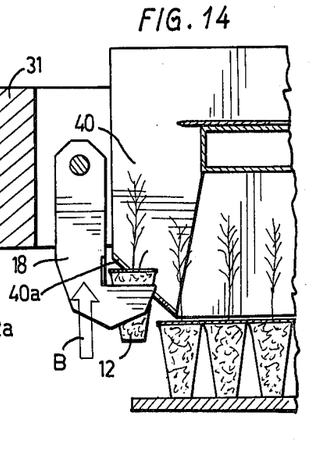
Figure 15:
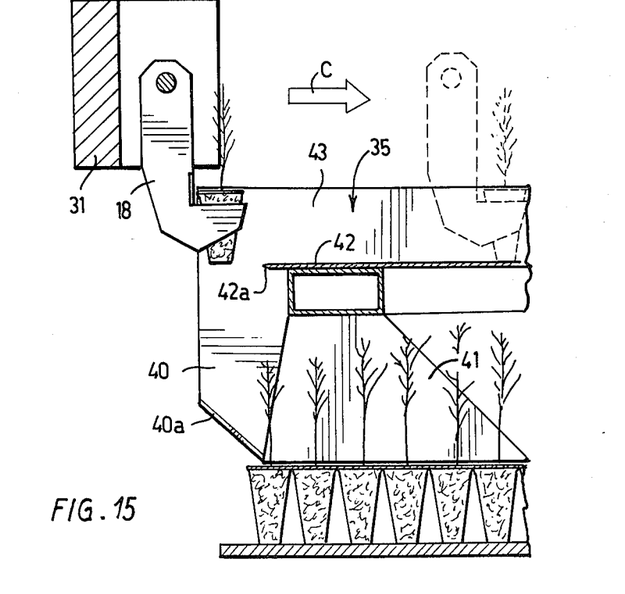

The feeding device operates as follows:

When the pivoting arm 31 of the shifting device 11 is positioned in the lowered grasping position shown with full lines in FIG. 10, the pressure disks 18 of the pairs of compression jaws 13 penetrate in between the cells of the foremost line of cells 8A and graps them (FIG. 13). The lifting cylinder 33 of the shifting device now receives an impulse to shift the pivoting arm along the pivoting shaft 30 upwards in the direction of the arrow B. When the pressure disks 18 shift the line of cells upwards, the stationary cutting disks 40 penetrate in between the cells so that the sharp bottom edges 40a of the cutting disks shear the cells apart from each other along the narrow connecting portions between the cells (FIG. 14). Thus, when the pivoting arm 31 has moved to its upper position, which is shown by broken lines in FIG. 10, the foremost line of cells 8A has become separated from the cell sheet and, moreover, the cells in the line of cells have become detached from each other. The holding strips 41 prevent the next line of cells in the cell sheet from following along with the lifted line of cells. When the pivoting arm is in the upper position, each cell is placed in front of its own shifting groove 25 (FIG. 15).

Figure 12:
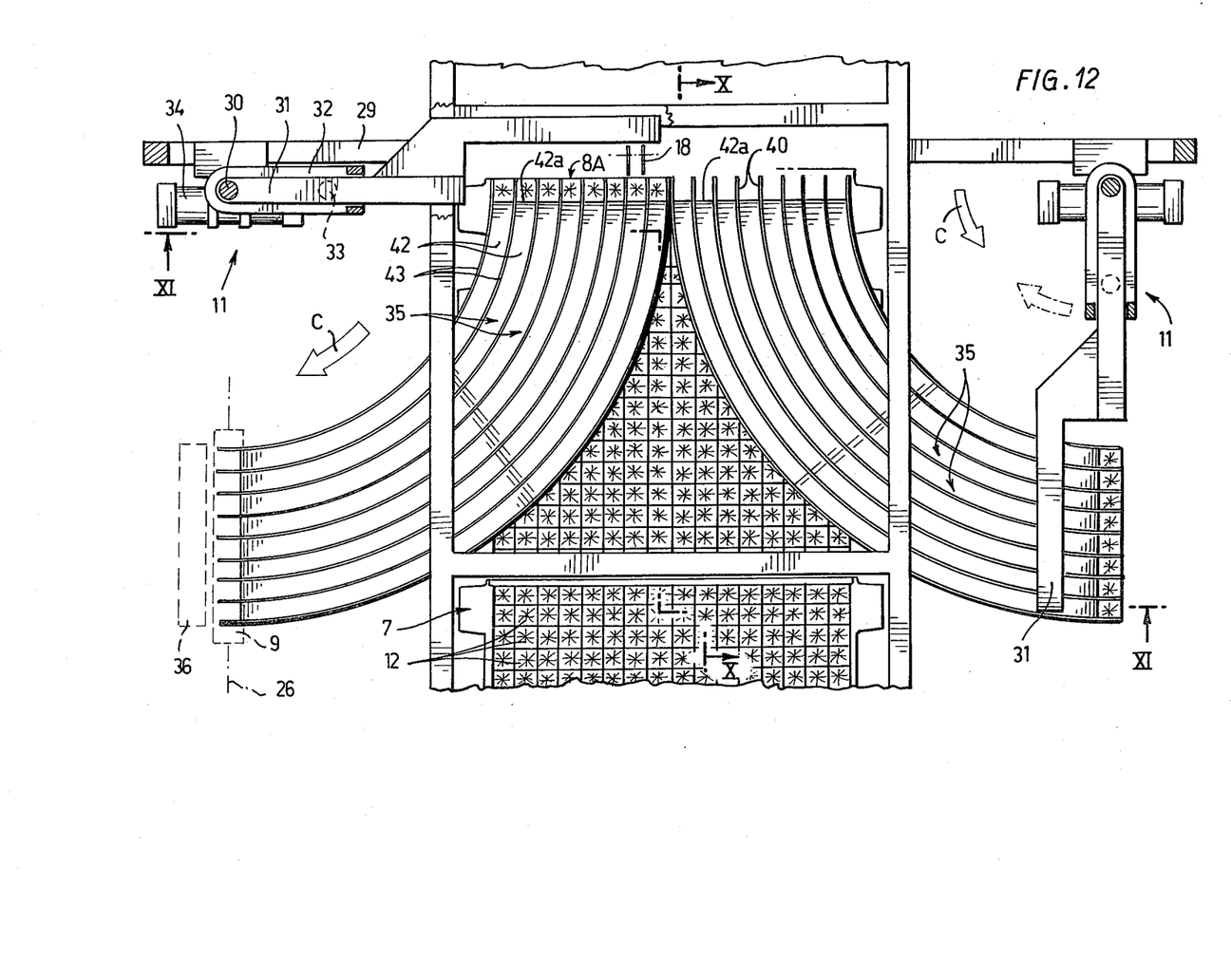
FIG. 12 shows the feeding device as viewed from above.

The pivoting cylinder 34 of the shifting device receives an impulse to pivot the pivoting arm 31 90° towards the side to the delivery position shown with full lines in the right half of FIG. 12, in the direction of the arrow C. In this position the cells are positioned above the distributor device 9, each cell above its own distribution shoot 10. The pairs of compression jaws of the shifting device receive an impulse to open at the same time as the cylinders 39 of the pushing means 36 receive an impulse to shift the pushing rods 37 downwards along the vertical bars 38. In this way the cells are by force shifted each of them to its own distribution shoot and further into the compartments 26 of the feeding conveyor 25. Hereupon the feeding conveyor moves forwards the distance of the filled part.

It is noticed that in this embodiment the cutting loose of the cells can be performed in the way of scissors, because the narrow connecting portions between the cells remain between compression jaws acting from below and cutting disks acting from above. The shearing forces press the cells ever more strongly in between the compression jaws and against the aligning plate 17. In the former embodiment the shear forces tend to lift the cells loose from between the compression jaws.

Owing to the combined vertical and horizontal shifting movement of the cells the additional advantage is achieved that any tough roots that may still connect the line of cells that was torn loose to the remaining cell sheet can be cut off against the sharp and edge 42a of the shifting groove bottoms 42.

The shifting of the cells into the distributor device is ensured by the circumstance that the compression jaws of the shifting device, by means of their aligning plate 17, push any fallen cells along the shifting grooves 35 to the distributor device.

After the cells have been moved into the distributor device, the pivoting cylinder pivots the pivot arm back to the initial end of the shifting grooves, whereupon the lifting cylinder lowers the pivot arm to the receiving position at the cell sheet for the purpose of grasping a new line of cells. The control of the cylinders and of the pairs of compression jaws can be achieved by means of simple limit switches.

The drawings and the related description are only supposed to illustrate the idea of the invention. In its details the method and device in accordance with the invention may display even considerable variation within the scope of the patent claims. The mechanical details of the constructions may be carried out in several different ways.

What we claim is:

1. A method for feeding plant cells to a planting device in a planting machine, said plant cells being in the form of a cell sheet which comprises a plurality of said plant cells arranged in a plurality of unified lines and connected to each other by narrow connecting portions which lie in a common plane, said method comprising detaching from the cell sheet a unified line of cells, moving the unified line of cells in a direction transverse to said common plane through a cutting means positioned in the path of movement of said connecting portions so as to detach the cells in the line from each other, and placing the separate cells into a distributing means which feeds the cells to the planting device.

2. A method as in claim 1 wherein said movement of the unified line of cells is downward through said cutting means.

3. A method as in claim 1 wherein said movement of the unified line of cells is upward through said cutting means.

4. A method as in claim 2 wherein the distributing means comprises a plurality of side-by-side open-top channels separated by upstanding partition walls which are provided with said cutting means.

5. A method as in claim 4 wherein the step of moving the unified line of cells includes grasping each cell of the line from two opposite sides with grasping means and moving the grasping means downwardly.

6. A method as in claim 3 wherein the steps of moving and cutting the unified line of cells include grasping each cell of the line from two opposite sides with grasping means and moving the grasping means upwardly past spaced apart fixed cutting discs into shifting channels which are separated by partition walls, said discs being provided on said partition walls.

7. A method as in claim 6 wherein the grasping means shifts the cells along the shifting channels to the distributing means.

8. Apparatus for feeding plant cells to a planting device in a planting machine, said plant cells being in the form of a cell sheet which comprises a plurality of said plant cells arranged in a plurality of unified lines and connected to each other by narrow connecting portions which lie in a common plane, said apparatus comprising support means for the cell sheet; a distributing assembly for passing individual cells into the planting device; a shifting device which includes grasping means for selectively grasping and releasing each cell of one line of cells; operating means for moving the grasping means in a direction transverse to said common plane so as to move a line of cells from said support in said transverse direction toward said distributing assembly; and cutting means located in the path of movement of the connecting portions of the line of cells which has been grasped by the grasping means whereby the cells in the line will be detached from each other during movement of the grasping means and delivered by the grasping means to the distributing assembly.

9. Apparatus as in claim 8 wherein the grasping means includes, for each cell in the line of cells, two pressure jaws movable between grasping and non-grasping positions.

10. Apparatus as in claim 8 wherein the operating means move the grasping means downwardly and wherein the cutting means includes blades which shear the connecting portions of the line of cells from below.

11. Apparatus as in claim 10 wherein the distributing assembly includes a plurality of side-by-side generally vertical open-top distribution channels separated by upright partition walls having sharp upper edges which form said cutting means.

12. Apparatus as in claim 26 wherein said grasping means move between said partition walls so as to separate the cells of the line from each other before said grasping means releases the cells.

13. Apparatus as in claim 8 wherein the operating means move the grasping means upwardly and wherein the cutting means includes blades which shear the connecting portions of the line of cells from above.

14. Apparatus as in claim 13 wherein said shifting device provides a plurality of horizontal shifting channels for passing individual cells to the distributing assembly, said channels having inlet ends for receiving individual cells and being separated by partition walls which at the inlet ends of the channels have extensions directed downwards, the extensions having lower edges which are sharp and which form said cutting means.

15. Apparatus as in claim 14 wherein said grasping means move between said partition walls so as to separate the cells of the line from each other before said grasping means releases the cells.

* * * * *